(No Model.)

A. J. PHILBRICK.
BICYCLE STAND.

No. 350,990. Patented Oct. 19, 1886.

WITNESSES.
Everett S. Benson.
Joseph H. Ishbaugh.

INVENTOR.
Andrew J. Philbrick
By Charles E. Pratt
atty

UNITED STATES PATENT OFFICE.

ANDREW J. PHILBRICK, OF BEVERLY, MASSACHUSETTS, ASSIGNOR TO THE POPE MANUFACTURING COMPANY, OF HARTFORD, CONNECTICUT.

BICYCLE-STAND.

SPECIFICATION forming part of Letters Patent No. 350,990, dated October 19, 1886.

Application filed April 28, 1886. Serial No. 200,427. (No model.)

*To all whom it may concern:*

Be it known that I, ANDREW J. PHILBRICK, of Beverly, in the county of Essex and State of Massachusetts, have invented certain new and useful Improvements in Bicycle-Stands, of which the following is a specification.

My improvements relate to that class of machines designed and used for supporting or holding bicycles in a vertical position, either upright or inverted, or both, when left on a floor or elsewhere without other support. Heretofore such stands have been made of two or more parts hinged together, sometimes holding the bicycle upright in devices for holding three points of the rim and tire, and sometimes by supporting the bottom of the wheel and holding it by devices extending to the axle, and sometimes by holding the bicycle in an inverted position by supporting two points of the handle-bar and one point of the perch, and sometimes by folding to furnish two of these methods of support, one for the upright position and one for the inverted when such folding of the stand has been transversed. These stands or holders have been of the movable or portable class. Various other devices have been in use for fixtures, and one or two rather cumbrous ones for movable stands constructed of wood. Some of these previous stands have been very serviceable, but all expensive and difficult to make, and very cumbrous to handle or to transport.

It is among the objects of my improvements to produce a simple inexpensive stand, which shall be adjustable for different sizes and shapes of bicycles, which shall hold the bicycle in both the inverted and the upright positions, and which shall take apart and fold very small and be easily portable, and take very little space, easily packed and shipped with other goods, and light in weight; and the nature of my improvements will be apparent from the following description, taken in connection with the drawings, in which—

Figure 1:
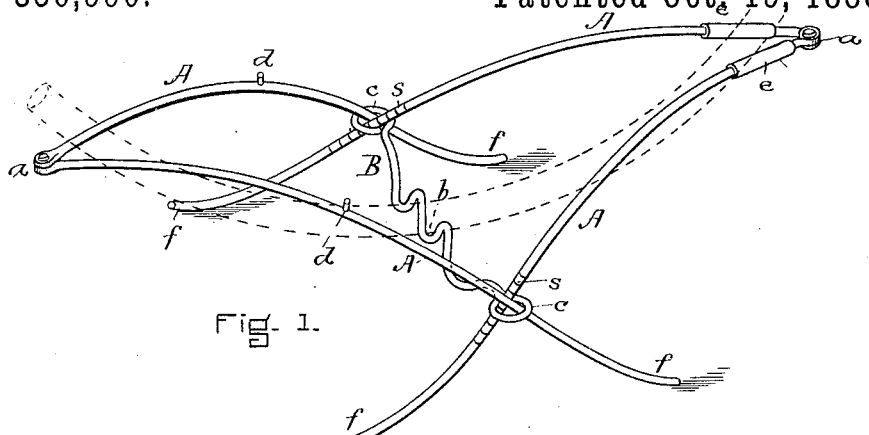
Figure 2:
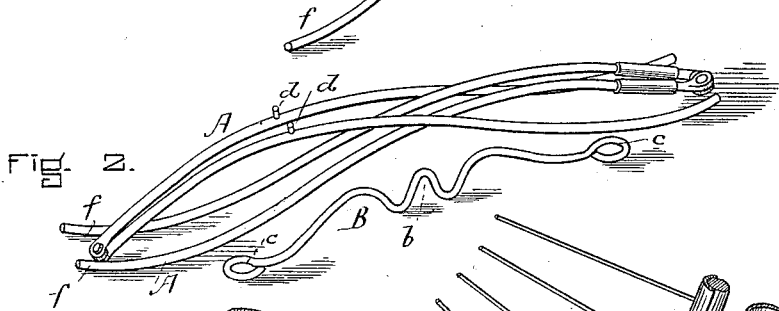
Figure 3:
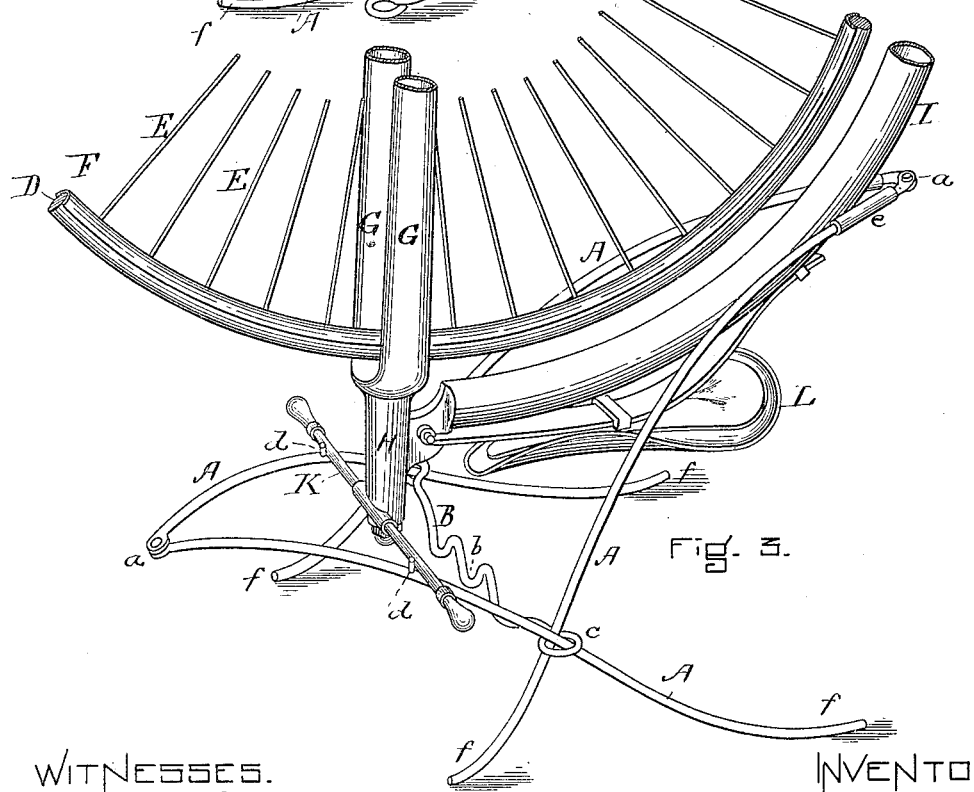

Figure 1 shows in perspective my improved stand placed in position for holding the bicycle in an upright position, the relative position and points of separating of the rim and tire of the wheel being shown by the dotted lines. Fig. 2 shows the same taken apart and loosely folded ready to pack; and Fig. 3 shows the same in position to support the bicycle in an inverted position, showing the parts of the bicycle in contact with it.

A A and A A are two pairs of prongs or side pieces, each part of which is hinged at *a*.

B is a thwart-piece looped at its ends *c c* and curved at its middle part to form a depression, *b*.

*d d* are studs or pins on one pair of the folding side pieces, and *e e* are rubber sleeves on the other pair.

*f f f f* are the free ends of the side pieces, which, when the stand is in position, serve as feet or points of support on the floor.

D is the tire, and E E the spokes, and F the rim or felly, of a bicycle-wheel; G G, the front in which it is held.

H is the head of the bicycle, I the perch, K K the handle-bars, and L the saddle.

For cheapness and strength of construction I make these four sides and the thwart-piece of ground-iron rods cut to proper length and curved to a suitable shape, as shown in the drawings. The hinges *a a* serve the double purpose of allowing the side pieces to change angle with each other as they are moved in and out of the loops in the thwart-piece and of folding them upon each other when the stand is taken apart and packed or carried. The curves F F, at the free ends of these side pieces, serve to give the stand better resting points or feet upon the floor, and these, as well as the opposite curves toward the hinged ends, serve to give the whole stand a better shape and position of contact-points with reference to the tire and rim of the wheel. The thwart-piece has its depression or holding device *b* in a plane vertical to the plane of the loops *c c*, and these latter are of sufficient size to allow one prong of each of the folding fore-and-aft pieces of the stand to pass through freely, and yet sufficiently limited in size to form a lock or check upon these parts when the stand is in position. A bicycle may be held in its upright or normal position, as is readily seen by holding three parts of its rim laterally and one or more of its tire and rim vertically, and as bicycles are made with varying sizes of wheels the relative position of these "holding-points," so to call them, must change with reference to any assumed point on the stand for each size of wheel. The necessary adjustment is secured in my improved stand by the construction which allows the prongs of the fore-and-aft pieces, by reason of their shape and the shape of the loops through which they pass and the hinges *a a* for lateral folding, to be changed in position with reference to the thwart-piece and with reference to each other. Either or both pairs of these fore-and-aft side pieces may be marked with a scale, as at *s s*, to denote the position to which the side piece should be brought in the loop of the thwart-piece for any particular size of bicycle. This scale, though convenient, is not necessary to the practicability of the stand, because a little familiarity with it enables the user to adjust it very readily without any such guide, although this guide is a convenience. The rubber sleeves *e e* are used simply to prevent the perch of the bicycle from being chafed when the bicycle is held in an inverted position. They may be used, however, at both ends, and possibly serve to protect the sides of the rim of the wheel when held in the upright position. The studs *d d* are placed at such points on one of the fore-and-aft pieces, as shown in the drawings, as to make a proper trig to the handle-bars when the bicycle is held inverted, the fore and-aft-side pieces in which they are, being inserted farther into the loops *c c*, in order to meet the handle-bars at the proper relative position with reference to the center of gravity and the base formed by the foot ends *f f*, the opposite fore-and-aft piece being drawn out of the loops to a suitable point with reference to the size of curvature of the perch which is to be held in them. These points may also be marked on the side pieces with scale-marks—such as *s s*—for convenience, if desired. When the stand is not in use or it is desired to carry it or pack it, the two fore-and-aft parts are withdrawn from the thwart-piece and the prongs folded together, and all three parts gathered up into a very small bundle, as may be seen.

Having thus described my improved stand in one form, (which I think the best and cheapest,) I may say, however, that I do not mean to limit my invention to the use of round rods or metallic rods, or to any particular form of curvature of the parts, or to the precise construction and arrangement of the different parts shown and described, since obvious modifications in these respects and some others may be made without departing from the spirit and substance of my invention.

I am aware of United States Letters Patent No. 256,936, and No. 322,057, and do not claim anything therein shown or described, my invention being in the nature of improvements upon stands for the same purposes, but in a different mechanical direction and for the attainment of better results.

I claim as new and of my invention—

1. A bicycle-stand constructed with two laterally-folding fore-and-aft parts and a thwart-piece, essentially as set forth.

2. A bicycle-stand constructed with two laterally-folding fore-and-aft parts and a thwart-piece, the latter being looped at each end about one prong of each fore-and-aft part, so as to hold them in any adjusted position, essentially as set forth.

3. A bicycle-stand constructed with parts for a separating-base, and device in the base for holding a wheel laterally at one point, and two devices for holding the wheel laterally at two other points above the plane of the first point, one or both of said two devices being adjustable fore and aft in or upon the rest of the stand, so as to hold wheels of different sizes in a vertical position, essentially as set forth.

4. A bicycle-stand constructed with parts for a separating-base, and device for holding the handle-bars of a bicycle, and a device for holding the perch of a bicycle, one or both of these devices being adjustable fore and aft in or upon the rest of the stand, so as to hold bicycles of different sizes in an inverted position, essentially as set forth.

5. A bicycle-stand constructed with four fore-and-aft side pieces, four supports on the ground, and a thwart-piece, constructed, arranged, and combined so as to hold adjustably bicycles of different sizes, essentially as set forth.

ANDREW J. PHILBRICK.

Witnesses:
STEDMAN BUTTRICK,
EVERETT S. BENSON.